United States Patent [19]
Matsuura

[11] Patent Number: 4,586,059
[45] Date of Patent: Apr. 29, 1986

[54] COLLECTED TONER CONVEYING DEVICE OF ELECTROSTATIC RECORDING APPARATUS

[75] Inventor: Yozo Matsuura, Machida, Japan
[73] Assignee: Richo Co., Ltd., Tokyo, Japan

[21] Appl. No.: 552,510
[22] Filed: Nov. 17, 1983

[30] Foreign Application Priority Data

Nov. 25, 1982 [JP] Japan ............................ 57-205453

[51] Int. Cl.[4] ............................ G01D 15/06
[52] U.S. Cl. ............................ 346/153.1; 355/3 DD; 118/652
[58] Field of Search ........... 346/153.1; 355/15, 3 DD; 118/652

[56] References Cited

U.S. PATENT DOCUMENTS 3,848,994 11/1974 Fraser ............................ 355/15
3,951,542 4/1976 Ito et al. ............................ 355/15

*Primary Examiner*—Thomas H. Tarcza
*Attorney, Agent, or Firm*—Cooper, Dunham, Clark, Griffin & Moran

[57] ABSTRACT

A collected toner conveying device of an electrostatic recording apparatus for receiving a toner remaining on a latent image carrier after a toner image is printed on a transfer-printing sheet and discharging the toner to outside. The collected toner conveying device includes a toner receiver of a semicircular cross section in its lower portion which extends in a direction perpendicular to the direction of travel of the latent image carrier for receiving the toner removed from the latent image carrier by a cleaning member, and a screw conveyor provided with spiral fins mounted on a shaft of the screw conveyor with no gap therebetween and located along the entire length of the screw conveyor to discharge the toner introduced into the toner receiver to outside. The screw conveyor has its velocity of rotation, the radius of the spiral fins and the pitch of the spiral fins set in such a manner that when the velocity at which the toner is collected to the toner receiver, the radius of the spiral fins, the number of revolutions of the screw conveyor and the pitch of the spiral fins are denoted by v (cm$^3$/minute), r (cm), N (RPM.) and P (cm) respectively, the following relation holds.

$$2v/\pi r^2 < NP$$

1 Claim, 5 Drawing Figures

COLLECTED TONER CONVEYING DEVICE OF ELECTROSTATIC RECORDING APPARATUS

BACKGROUND OF THE INVENTION

This invention relates to a collected toner conveying device of an electrostatic recording apparatus wherein a toner image formed on a latent image carrier by an electrostatic photography process is printed by transfer-printing on a transfer-printing sheet and a toner collected from the latent image carrier after cleaning thereof is performed is conveyed and discharged to the outside.

In an electrostatic recording apparatus in which a toner image formed by an electrostatic photography process on a latent image carrier, such as a photosensitive member, is printed on a transfer-printing sheet by transfer-printing, toner remaining on the surface of the latent image carrier after the toner image has been printed on a transfer-printing sheet is removed therefrom usually by means of a cleaning member, such as a cleaning roller having a fur brush attached to its surface or a cleaning blade and collected to toner receiver of a semi-circular cross section in its lower portion having a length substantially equal to the width of the latent image carrier which extends in a direction perpendicular to the direction of travel of the latent image carrier. The toner introduced into the toner receiver is discharged therefrom by a screw conveyor mounted in the toner receiver which extends along the entire length thereof. In electrostatic recording apparatus of this construction, the latent image carrier is usually a photosensitive member, so that the latent image carrier shall hereinafter be referred to as a photosensitive member.

A new type of electrostatic recording apparatus developed in recent years is constructed such that, to facilitate removal of transfer-printing sheets involved in a jam and maintenance of the apparatus, an upper unit of the apparatus including the photosensitive member and parts located thereabove, including the cleaning member and a collected toner coveying device composed of the toner receiver and the screw conveyor, tilts in a direction perpendicular to the direction in which the photosensitive member travels or in an axial direction of the screw conveyor referred to hereinabove and opens the transfer-printing sheet path.

In this type of electrostatic recording apparatus, when the apparatus is opened, the screw conveyor for discharging the toner tilts in an axial direction. If the screw conveyor is of the type which is formed by winding a spiral wire around a shaft of the screw conveyor with a gap therebetween, the toner in the toner receiver would move toward a portion thereof which is at a lower level through the gap between the spiral wire and the shaft as the toner receiver tilts upon the apparatus being opened. The toner moving toward the lower level might spill from the toner receiver at one end thereof lower than the other end thereof, thereby contaminating the photosensitive member and the transfer-printing coveying section.

When the screw conveyor is shaped like an auger in which spiral fins in contact with the semi-circular groove in the lower portion of the toner receiver are wound on the shaft of the screw conveyor with no gap therebetween, the phenomenon described hereinabove does not occur. However, when the recovered toner collected in the toner receiver exceeds a predetermined volume, the toner could slide over the upper portion of the screw conveyor and collect in the portion of the toner receiver which is at a lower level and might spill from the toner receiver.

SUMMARY OF THE INVENTION

This invention has as its object the provision of a collected toner conveying device which is free from the phenomenon that when a recovered toner receiver tilts a recovered toner in a portion of the toner receiver at a higher level shifts toward a portion thereof which is at a lower level by gravity, which collected toner conveying device is suitable for use with an electrostatic recording apparatus of the type which uses as a collected toner conveying member a screw conveyor having a spiral fins wound on a shaft of the screw conveyor with no gap therebetween and causes an upper unit of the apparatus including a photosensitive member, a cleaning device and the collected toner conveying device to tilt when the apparatus is opened.

The outstanding characteristic of the invention enabling the aforesaid object to be accomplished is that when the velocity at which a toner is recovered to the collected toner receiver, the radius of the spiral fins of the screw conveyor, the number of revolutions of the screw conveyor and the pitch of the spiral fins are denoted by v ($cm^3$/minute), r (cm), N (RPM.) and P (cm) respectively, the relation $2v/\pi r^2 < NP$ holds.

BRIEF DESCRIPTION OF THE DRAWINGS

FIG. 3*b* is a side view of the collected toner conveying device shown in FIG. 3*a.

DESCRIPTION OF THE PREFERRED EMBODIMENT

A preferred embodiment of the invention will now be described by referring to the accompanying drawings.

Figure 1:
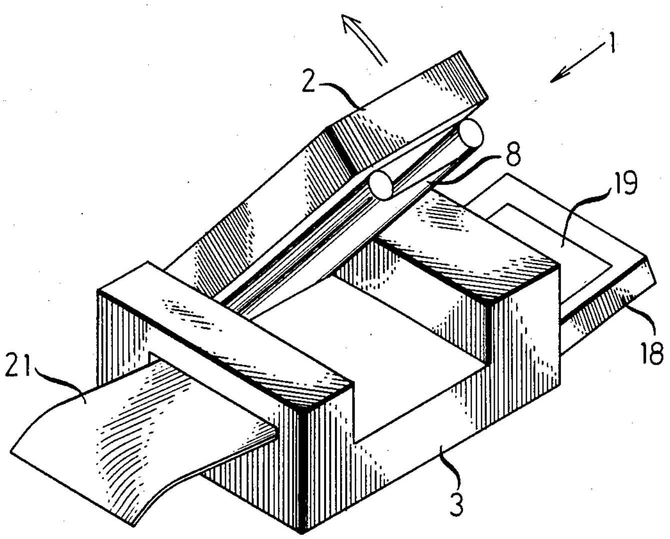
FIG. 1 is a perspective view of one example of the electrostatic recording apparatus in which the present invention is incorporated.
Figure 2:
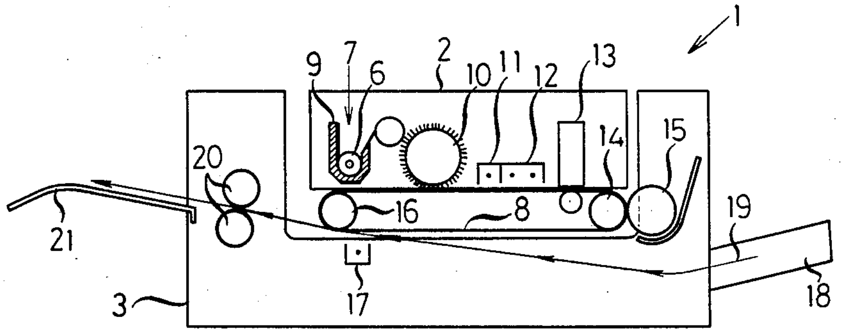
FIG. 2 is a sectional side view of the apparatus shown in FIG. 1.
Figure 3A:
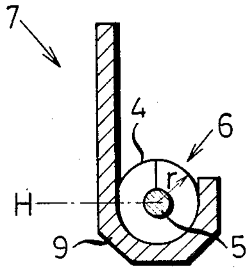
FIG. 3*a* is a transverse sectional view of the collected toner conveying device of the apparatus shown in FIG. 1.
Figure 3B:
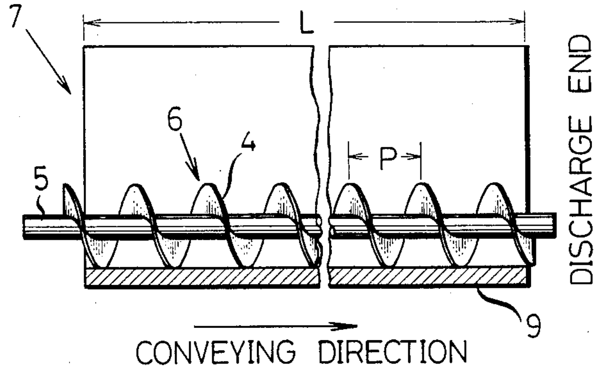

In a electrostatic recording apparatus 1 shown in FIGS. 1 and 2, an endless-belt photosensitive member 8 is used as a latent image carrier. Located along a top surface of an upper run of the endless-belt photosensitive member 8 from its left end toward its right end in FIG. 2 are a collected toner conveying device 7 comprising, as shown in FIGS. 3*a* and 3*b,* a toner receiver 9 in the form of a letter J in cross section and a screw conveyor 6 of an auger shape mounted in the toner receiver 9 and having spiral fins 4 wound on a shaft 5 with no gap therebetween in such a manner that the spiral fins 4 can rotate in a lower portion of the receiver 9, a cleaning roller 10 having a fur brush on its outer periphery, an electric charge removing device 11, a charging device 12 and an optical write-in device 13. The endless-belt photosensitive member 8 is trained over a pulley 14 having a developing device 15 located adjacent thereto on its right side, and a pulley 16 having a transfer-printing charger 17 located adjacent thereto and below it. A sheet feeding cassette 18 is located at one side of a recording apparatus body and supplies a transfer-printing sheet 19 which moves between the lower run of the endless-belt photosensitive member 8 and the transfer-printing charger 17. While the transfer-printing sheet 19 is in motion, a toner image formed on the surface of the endless-belt photosensitive member 8 by means of the charger 12, optical write-in device 13 and developing device 15 is printed by transfer-printing on the transfer-printing sheet 19 and fixed by a fixing device 20. The transfer-printing sheet 19 having the toner image fixed thereon is ejected on to a tray 21 located at the other side of the recording apparatus body. All the devices described hereinabove, the endless-belt photosensitive member 8 trained over the pulleys 14 and 16, collected toner conveying device 7, cleaning roller 10, electric charge removing device 11, charger 12 and optical write-in device 13 are connected together into a unitary structure to constitute an upper unit 2. By lifting the upper unit 2 at its forward end as shown in FIG. 1, the upper unit 2 pivotably supported at its rearward end can be moved upwardly relative to a lower unit 3 so as to thereby expose the path of travel of the transfer-printing sheet 19.

In the recording apparatus of the aforesaid construction, after the toner-image is printed by means of the transfer-printing charger 17 on the transfer-printing sheet 19, toner remaining on the endless-belt photosensitive member 8 is removed by the cleaning roller 10 and collected in the toner receiver 9 of the collected toner conveying device 7 from which the toner is discharged to the outside by means of the screw conveyor 6 of the auger shape. The collected toner conveying device 7 composed of the toner receiver 9 and screw conveyor 6 extends perpendicular to the direction of travel of the endless-belt photosensitive member 8, so that when the upper unit 2 is lifted at its forward end to open the recording apparatus, the collected toner conveying device 7 tilts in such a manner that its rearward end becomes lower than its forward end, as seen in FIG. 1.

When the recording apparatus is opened as aforesaid, the toner collected in the toner receiver 9 might move over the screw conveyor 6 and shift from the higher end of the receiver 9 toward the lower end thereof. To avoid this phenomenon, the velocity of rotation of the screw conveyor 6 and the pitch of the spiral fins 4 are set as follows according to the invention.

In FIGS. 3*a* and 3*b*, let the pitch of the spiral fins 4, the number of revolutions of the shaft 5 and the length of the toner receiver 9 be denoted by P (cm), N (rpm.) and L (cm) respectively. The time t required for the screw 6 to clear the toner receiver 9 of all the toner collected therein can be expressed by the following formula, by assuming that no toner is introduced into the receiver 9 during the operation:

$$t=L/N\cdot P.$$

Then assume that the toner is collected in the toner receiver 9 at a velocity of v ($cm^3$/minute). The volume of the toner introduced into the toner receiver 9 can be expressed by $t\cdot v$ ($cm^3$).

In steadystate condition, the volume of the toner introduced into the toner receiver 9 in t minutes should naturally be equal to the volume of the toner discharged therefrom in t minutes. However, in steadystate condition, the volume of the toner collected in the toner receiver 9 would be ½ the volume of the toner introduced thereinto in t minutes. This could be accounted for by the fact that the toner entering the toner receiver 9 in the vicinity of its discharge port would be discharged immediately therefrom but the toner introduced thereinto at an end thereof opposite the discharge port would take t minutes for it to be discharged from the receiver, so that the time required for the toner to be discharged would be one-half t minutes on an average. Thus the volume V of the toner staying in the toner receiver 9 at all times can be expressed by the following equation:

$$V=\tfrac{1}{2}t\cdot v=Lv/2NP \qquad (1)$$

When the volume V of the toner staying in the toner receiver 9 exceeds a level H shown in FIG. 3*a*, the toner would move over the screw 6 through a gap between edges of the spiral fins 4 above the level H and an inner surface of the receiver 9 as the collected toner conveying device 7 tilts upon the upper unit 2 being lifted at its forward end, and as a result the toner would shift from a portion of the receiver 9 at a higher level to a portion thereof at a lower level.

Figure 4:
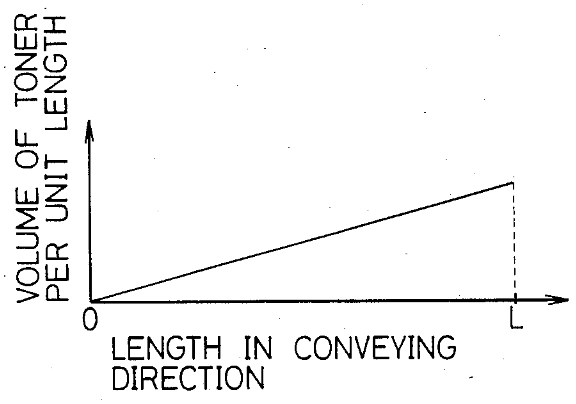
* and FIG. 4 is a diagrammatic representation of the distribution of a toner in the toner receiver per unit length as seen in the direction in which it is conveyed.

In actual practice, the distribution of the volume of toner in the toner receiver 9 is such that the volume is maximized on the discharge end of the receiver 9 by the aforesaid reason, as shown in FIG. 4. Thus, it is necessary that the level H is not exceeded on the discharge side of the receiver 9.

The volume V of the toner staying in the toner receiver 9 at all times should be less than the approximate volume of the portion of the receiver 9 below the level H shown in FIG. 3*a*. Thus, when the radius of the spiral fins 4 is denoted by r (cm), the following relation should hold:

$$V<\pi r^2L/4 \qquad (2)$$

The following relation is obtained from equations (1) and (2):

$$L\cdot v/2NP<\pi r^2L/4$$

$$2v/\pi r^2<NP \qquad (3)$$

By setting the velocity of rotation of the screw 6, the radius of the screw 6 and the pitch of the spiral fins 4 as expressed by equation (3), it is possible to regulate the movement of the toner in the toner receiver 9 in such a manner that the movement of the toner over the spiral fins 4 from a higher level to a lower level can be avoided and spilling of the toner from the receiver 9 can be prevented when the upper unit 2 is lifted at its forward end to open the recording apparatus.

Since the toner does not move over the spiral fins 4 when the recording apparatus is opened by lifting the upper unit 2 at its forward end, the danger that a toner discharge pipe might be jammed or might overflow can be reduced or eliminated even if the toner discharge port is located on one end of the receiver 9 which become lower than the other end when the recording apparatus is opened, thereby enabling discharge of the toner to be smoothly effected.

In the embodiment shown and described hereinabove, the latent image carrier has been shown and described as being in the form of an endless-belt photosensitive member. The invention is not limited to this specific form of the latent image carrier and the latent image carrier may be of any desired shape, such as a drum shape. Also, any known cleaning member other than the cleaning roller, such as a cleaning blade, may be used without departing from the scope of the invention.

What is claimed is:

1. In an electrostatic recording apparatus comprising a latent image carrier formed thereon with a toner image by an electrostatic photography process which is printed by transfer-printing on a transfer-printing sheet, and a cleaning member for removing from said latent image carrier and collecting toner remaining thereon after the toner image is printed on the transfer-printing sheet, a collected toner conveying device comprising:

a toner receiver of a semicircular cross section in its lower portion which extends in a direction perpendicular to the direction of travel of said latent image carrier for receiving the toner removed from the latent image carrier by the cleaning member; and a screw conveyor provided with spiral fins mounted on a shaft of the screw conveyor with no gap therebetween and located along the entire length of the screw conveyor and rotating in the toner receiver to discharge the toner introduced into the toner receiver to the outside;

wherein an upper unit of the apparatus including the toner receiver tilts in an axial direction of the screw conveyor;

wherein the lower halves of said spiral fins of said screw conveyor are in contact with the inner surface of semicircular cross section of the toner receiver with substantially no gap therebetween; and wherein said screw conveyor has its velocity of rotation, the radius of the spiral fins and the pitch of the spiral fins set in such a manner that when the velocity at which the toner is recovered to the toner receiver, the radius of the spiral fins, the number of revolutions of the screw conveyor and the pitch of the spiral fins are denoted by v (cm/minute), r (cm), N (RPM.) and P (cm) respectively, the following relationship holds:

$$2v/\pi r^2 < NP.$$

* * * * *